(12) United States Patent
Belakshe et al.

(10) Patent No.: US 10,961,439 B2
(45) Date of Patent: Mar. 30, 2021

(54) DEGRADABLE THERMOSETTING COMPOSITIONS FOR ENHANCED WELL PRODUCTION

(71) Applicant: HALLIBURTON ENERGY SERVICES, INC., Houston, TX (US)

(72) Inventors: Ravikant Belakshe, Pune (IN); Sumit Ramesh Songire, Pune (IN); Lalit P. Salgaonkar, Pune (IN)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 99 days.

(21) Appl. No.: 16/325,609

(22) PCT Filed: Dec. 6, 2016

(86) PCT No.: PCT/US2016/065104
§ 371 (c)(1),
(2) Date: Feb. 14, 2019

(87) PCT Pub. No.: WO2018/106217
PCT Pub. Date: Jun. 14, 2018

(65) Prior Publication Data
US 2019/0177604 A1    Jun. 13, 2019

(51) Int. Cl.
*C09K 8/68* (2006.01)
*C09K 8/512* (2006.01)
(Continued)

(52) U.S. Cl.
CPC ............. *C09K 8/685* (2013.01); *C09K 8/508* (2013.01); *C09K 8/512* (2013.01); *C09K 8/516* (2013.01);
(Continued)

(58) Field of Classification Search
CPC ........ C09K 8/685; C09K 8/508; C09K 8/512; C09K 8/516; C09K 8/62; C09K 8/805;
(Continued)

(56) References Cited

U.S. PATENT DOCUMENTS 7,178,596 B2    2/2007   Blauch et al.
7,273,104 B2 *  9/2007   Wilkinson .............. E21B 43/26
                                                    166/305.1
(Continued)

FOREIGN PATENT DOCUMENTS

WO    WO-2016/018374 A1    2/2016

OTHER PUBLICATIONS

Songqi Ma, et al; DOI: 10.1021/acs.macromol.5b01923 Macromolecules 2015, 48, 7127-7137 entitled Naturally Occurring Acids as Cross-Linkers to Yield VOC-Free, High-Performance, Fully Bio=Based, Degradable Thermosets; pubs.acs.org/Macromolecules (11 pgs.).

(Continued)

*Primary Examiner* — Angela M DiTrani Leff
(74) *Attorney, Agent, or Firm* — Haynes and Boone, LLP

(57) ABSTRACT

Methods of enhancing well production, including enhancing fluid flow by conductivity enhancement, diversion, and fluid-loss control, are described. The method of enhancing fluid flow includes introducing a fracturing fluid including resin-coated proppant particles into the formation; introducing (i) a thermosetting composition including one or more di- or tricarboxylic acids and one or more epoxidized fatty acid esters or (ii) thermoset particulates comprising an anhydride network of one or more epoxidized fatty acid esters cross-linked with one or more di- or tricarboxylic acids, into the formation; allowing the resin-coated proppant particles and (i) the thermosetting composition or (ii) the (Continued)

thermoset particulates to form a proppant matrix in a fracture; and allowing voids to form in the proppant matrix.

20 Claims, 6 Drawing Sheets

(51) Int. Cl.
| | |
|---|---|
| C09K 8/62 | (2006.01) |
| C09K 8/80 | (2006.01) |
| E21B 43/267 | (2006.01) |
| E21B 33/138 | (2006.01) |
| C09K 8/508 | (2006.01) |
| E21B 43/25 | (2006.01) |
| C09K 8/516 | (2006.01) |
| E21B 43/26 | (2006.01) |

(52) U.S. Cl.
CPC .............. *C09K 8/62* (2013.01); *C09K 8/805* (2013.01); *E21B 33/138* (2013.01); *E21B 43/25* (2013.01); *E21B 43/26* (2013.01); *E21B 43/267* (2013.01)

(58) Field of Classification Search
CPC ........ E21B 33/138; E21B 43/25; E21B 43/36; E21B 43/2605; E21B 43/2607; E21B 43/27; E21B 43/267
See application file for complete search history.

(56) References Cited

U.S. PATENT DOCUMENTS

| | | | |
|---|---|---|---|
| 8,109,335 | B2 | 2/2012 | Luo et al. |
| 8,714,249 | B1 | 5/2014 | Tang |
| 9,080,440 | B2 | 7/2015 | Panga et al. |
| 2004/0261996 | A1 | 12/2004 | Munoz, Jr. et al. |
| 2006/0157243 | A1 | 7/2006 | Nguyen |
| 2011/0278003 | A1 | 11/2011 | Rediger |
| 2011/0278011 | A1 | 11/2011 | Crainich, Jr. et al. |
| 2012/0181034 | A1 | 7/2012 | Bour et al. |
| 2013/0048282 | A1 | 2/2013 | Adams et al. |
| 2013/0081813 | A1 | 4/2013 | Liang et al. |
| 2014/0076570 | A1 | 3/2014 | Nguyen |
| 2014/0116701 | A1* | 5/2014 | Tang ...................... C09K 8/725 166/292 |
| 2014/0174737 | A1* | 6/2014 | Reddy ................... E21B 43/267 166/281 |
| 2015/0041132 | A1* | 2/2015 | Nelson ................... C09K 8/508 166/280.1 |
| 2015/0345269 | A1 | 12/2015 | Kelly |
| 2016/0102244 | A1 | 4/2016 | Takahashi et al. |

OTHER PUBLICATIONS

Exumbua M. Monono, et al; Industrial Crops and Products vol. 74, Nov. 15, 2015, pp. 987-997 http://dx.doi.org/10.1016/j.indcrop.2015.06.035 entitled Pilot scale (10kg) production and characterization of expoxidized sucrose soyate (11 pgs.).

Manisha Pawar, et al; Industrial Crops and Products vol. 89, Jun. 9, 2016, pp. 434-447 http://dx.doi.org/10.1016/j.indcrop.2016.05.025 entitled Biodegradable bioepoxy resins based on epoxidized natural oil (cottonseed & algae) cured with citric and tartaric acids through solution polymerization: A renewable approach (14 pgs.).

Muthui Z. W., et al; Asian Journal of Natural & Applied Sciences vol. 3(1) Mar. 2014 http://ww.ajsc.leena-luna.co.jp/AJSCPDFs/Vol.3(1)-02).pdf entitled Determination of the Glass Transition Temperature and Modulus of PLA Films Using Dynamic Mechanical Analysis at 50° C. and Amplitude of 10 μm (8 pgs.).

International Search Report and Written Opinion received in International Application No. PCT/US2016/065104, dated Sep. 6, 2017, 11 pages.

International Preliminary Report on Patentability received in International Application No. PCT/US2016/065104, dated Jun. 11, 2019, 9 pages.

* cited by examiner

MAIN CURING REACTION:

HYDROLYSIS OF EPOXIDES:

ESTERIFICATION:

FORMATION OF ANHYDRIDE:

DEGRADABLE THERMOSETTING COMPOSITIONS FOR ENHANCED WELL PRODUCTION

CROSS-REFERENCE TO RELATED APPLICATION

The present application is a U.S. National Stage patent application of International Patent Application No. PCT/US2016/065104, filed on Dec. 6, 2016, the benefit of which is claimed and the disclosure of which is incorporated herein by reference in its entirety.

BACKGROUND

The present invention relates generally to methods and compositions for treating subterranean formations. In particular, the present invention relates to methods of enhancing well production (e.g., by enhancing fluid flow) from a subterranean formation by introducing thermosetting compositions into the formation. The thermosetting compositions include water, one or more di- or tricarboxylic acids, and one or more epoxidized fatty acid esters.

Treatment fluids may be used in a variety of subterranean treatments. Examples of common subterranean treatments include drilling operations, fracturing operations, perforation operations, sand control treatments, and acidizing treatments.

Hydraulic fracturing is a technique for stimulating the production of a subterranean formation. The technique generally involves injecting a viscous liquid through a wellbore into a portion of a subterranean formation at a chosen rate and pressure to overcome the formation's stresses and form or enhance a fracture in the formation, and placing proppant particulates in the fracture to, among other things, maintain the fracture in a propped condition when the injection pressure is released. The resultant propped fracture provides a conductive channel in the formation for fluids to flow to the wellbore.

The degree of stimulation afforded by the hydraulic fracture treatment is largely dependent on the permeability and width of the propped fracture. Thus, the productivity of the well, in effect, becomes a function of fracture conductivity. To enhance well productivity, it may be necessary to enhance fracture conductivity.

Oftentimes, to effectively prop open the fractures as well as to prevent proppant particulate flow back, the proppant particulates are caused to consolidate within the fractures. One conventional means of doing this is to use resin-coated proppant particulates so that when the resin cures, the proppant particulates can consolidate into a mass within the fractures.

Although consolidating the proppant particulates within a fracture may have some benefits, for example, preventing proppant particulate flow back, such methods may adversely affect the conductivity of the fracture. That is, some methods of consolidating proppant particulates themselves may introduce a barrier to the free flow of fluids from the subterranean formation to the wellbore for subsequent production. Fracture conductivity may suffer as a result. This is undesirable as this may affect overall well productivity.

In addition, after a certain amount of time, fractures may cease to produce oil or gas. To provide for the production of more oil and gas, a fracturing fluid may again be pumped into the formation to form additional fractures. The previously used fractures, however, must be plugged to divert the fracturing fluid away from the old fractures and prevent the loss of fracturing fluid into the formation.

Traditional fracturing operations typically use solid particulate diverting agents to plug existing fractures. These particulate diverting agents, however, must be subsequently removed to allow the maximum flow of hydrocarbons from the wellbore. Methods for removing these particulate diverting agents often involve considerable time and expense to carry out.

Thus, there is a need for improved compositions and methods for treating (e.g., fracturing) a subterranean formation.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

Figure 1:
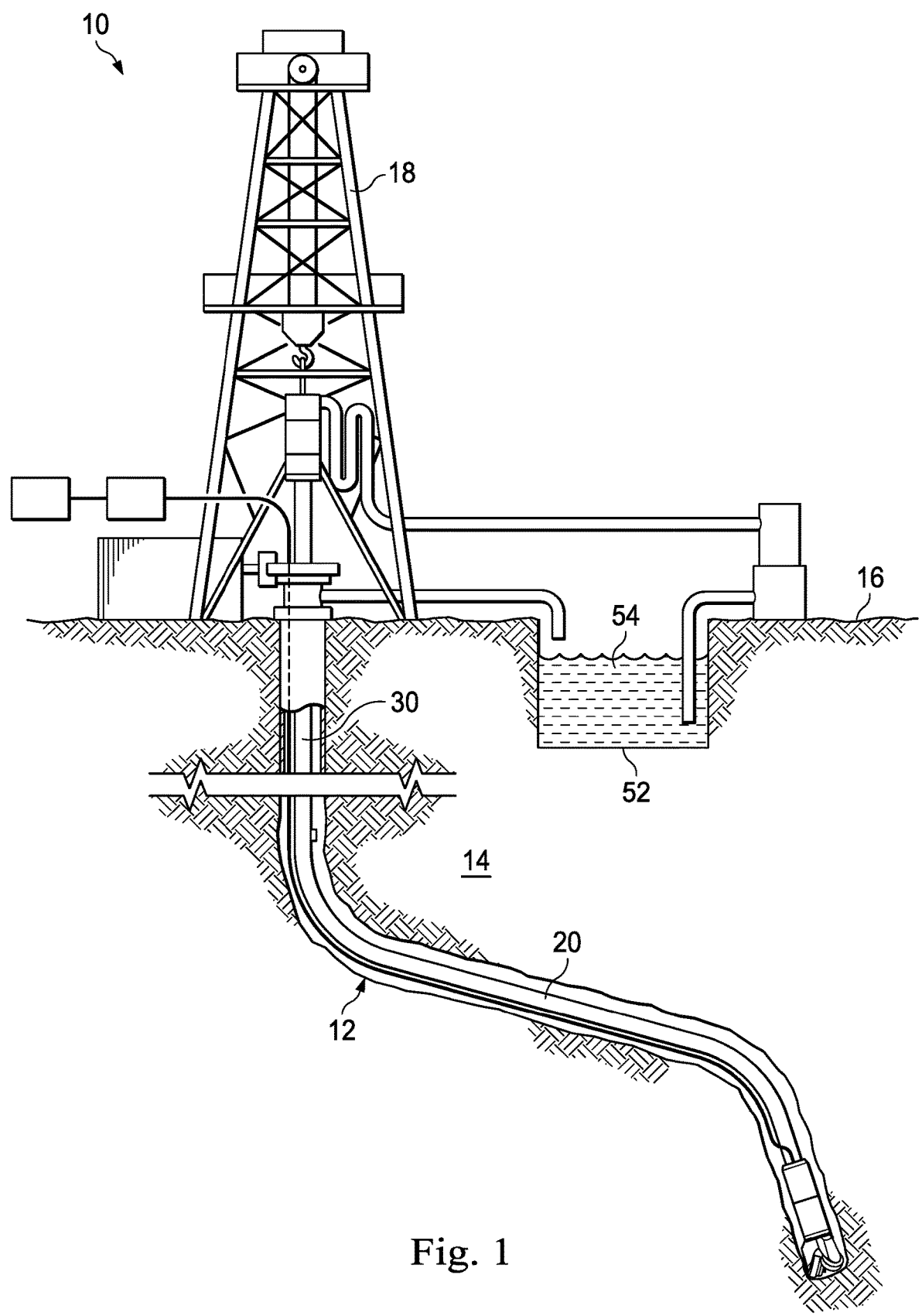
FIG. 1 illustrates a land-based drilling and production system.

According to several exemplary embodiments, the methods and compositions of the present invention are used for multiple applications, including conductivity enhancement, diversion, and fluid loss control. Thermosetting compositions are described that include bio-based materials (i.e., natural acids and epoxidized fatty acid esters). Advantageously, the thermosets formed from the thermosetting compositions exhibit good mechanical properties and degrade in the presence of alkaline or basic fluids. In addition, the thermosets have high glass transition temperatures, and degrade faster compared to traditional degradable particulates.

According to several exemplary embodiments, a method of enhancing fluid flow from a subterranean formation is provided. The method includes introducing a fracturing fluid comprising resin-coated proppant particles into the formation; introducing (i) a thermosetting composition including one or more di- or tricarboxylic acids and one or more epoxidized fatty acid esters or (ii) thermoset particulates including an anhydride network of one or more epoxidized fatty acid esters cross-linked with one or more di- or tricarboxylic acids, into the formation; allowing the resin-coated proppant particles and (i) the thermosetting composition or (ii) the thermoset particulates to form a proppant matrix in a fracture; and allowing voids to form in the proppant matrix. According to several exemplary embodiments, resin-coated proppant particles include a resin-coated sand. According to several exemplary embodiments, a pump is used to introduce the fracturing fluid into the formation.

According to several exemplary embodiments, the thermosetting composition further includes water, and the water is present in the thermosetting composition in an amount of about 0.01 to 50 percent by weight of the thermosetting composition; the one or more di- or tricarboxylic acid is present in the thermosetting composition in an amount of about 0.01 to 50 percent by weight of the thermosetting composition; and the one or more epoxidized fatty acid esters is present in the thermosetting composition in an amount of about 0.01 to 30 percent by weight of the thermosetting composition.

According to several exemplary embodiments, the one or more epoxidized fatty acid esters include epoxidized sucrose soyate (ESS), an epoxidized glycerol ester of one or more fatty acids of a plant oil, or both. Suitable plant oils include soybean oil and linseed oil.

According to several exemplary embodiments, the method further includes introducing a fracturing fluid including proppant particles into the formation after introducing the thermosetting compositions or the thermoset particulates into the formation. In this way, the thermosetting compositions functions as a spacer fluid between two proppant-laden stages.

According to several exemplary embodiments, allowing voids to form in the proppant matrix includes treating a thermoset formed from the thermosetting composition with an alkaline fluid. According to several exemplary embodiments, the alkaline fluid is introduced into the formation separately from the fracturing fluid and the thermosetting composition.

According to several exemplary embodiments, allowing voids to form in the proppant matrix includes introducing the thermoset particulates into the formation in an alkaline carrier fluid. According to several exemplary embodiments, the alkaline carrier fluid includes a fracturing fluid.

According to several exemplary embodiments, a method of diverting a treatment fluid in a subterranean formation is provided. The method includes introducing a first fracturing fluid into the formation to create fractures in the formation; introducing (i) a thermosetting composition including one or more di- or tricarboxylic acids and one or more epoxidized fatty acid esters or (ii) thermoset particulates including an anhydride network of one or more epoxidized fatty acid esters cross-linked with one or more di- or tricarboxylic acids, into the formation; allowing (i) the thermosetting composition to form a thermoset, or (ii) the thermoset particulates, to block the created fractures in the formation; introducing a second fracturing fluid into the formation to create additional fractures; and diverting the second fracturing fluid away from the created fractures.

According to several exemplary embodiments, the thermosetting composition further includes water, and the water is present in the thermosetting composition in an amount of about 0.01 to 50 percent by weight of the thermosetting composition; the one or more di- or tricarboxylic acid is present in the thermosetting composition in an amount of about 0.01 to 50 percent by weight of the thermosetting composition; and the one or more epoxidized fatty acid esters is present in the thermosetting composition in an amount of about 0.01 to 30 percent by weight of the thermosetting composition.

According to several exemplary embodiments, the one or more epoxidized fatty acid esters include epoxidized sucrose soyate (ESS), an epoxidized glycerol ester of one or more fatty acids of a plant oil, or both.

According to several exemplary embodiments, the thermosetting composition or the thermoset particulates are introduced into the formation in alternating intervals with a fracturing fluid. For example, a fracturing fluid is introduced into the formation, then the thermosetting composition (or thermoset particulates) is introduced, then the fracturing fluid again, and then the thermosetting composition (or thermoset particulates) again. This cycle can be repeated any number of times.

According to several exemplary embodiments, the created fractures and the additional fractures are part of a single fracture network. In these embodiments, the thermosetting compositions or thermoset particulates are used to divert fluid within a fracture.

According to several exemplary embodiments, the method further includes removing the formed thermoset or the thermoset particulates from the created fractures. According to several exemplary embodiments, removing the formed thermoset or the thermoset particulates from the created fractures includes treating the formed thermoset or the thermoset particulates with an alkaline fluid.

According to several exemplary embodiments, a method of controlling fluid loss in a subterranean formation is provided. The method includes introducing (i) a thermosetting composition including one or more di- or tricarboxylic acids and one or more epoxidized fatty acid esters or (ii) thermoset particulates including an anhydride network of one or more epoxidized fatty acid esters cross-linked with one or more di- or tricarboxylic acids, into a zone of high permeability (e.g., about 12,000 millidarcy (mD)) of the formation; allowing (i) the thermosetting composition to form a thermoset, or (ii) the thermoset particulates, to block the zone of high permeability to reduce fluid loss through the zone of high permeability; and introducing a treatment fluid into a zone of low permeability (e.g., about 0.1 to 100 mD) of the formation.

According to several exemplary embodiments, the thermosetting composition further includes water, and the water is present in the thermosetting composition in an amount of about 0.01 to 50 percent by weight of the thermosetting composition; the one or more di- or tricarboxylic acids is present in the thermosetting composition in an amount of about 0.01 to 50 percent by weight of the thermosetting composition; and the one or more epoxidized fatty acid esters is present in the thermosetting composition in an amount of about 0.01 to 30 percent by weight of the thermosetting composition.

According to several exemplary embodiments, the one or more epoxidized fatty acid esters include epoxidized sucrose soyate (ESS), an epoxidized glycerol ester of one or more fatty acids of a plant oil, or both.

According to several exemplary embodiments, the method further includes introducing an alkaline fluid into the formation to degrade the formed thermoset or the thermoset particulates.

Treatment fluids may be used in any number of subterranean operations. As used herein, "treat," "treatment," and "treating" refer to any subterranean operation that uses a fluid in conjunction with achieving a desired function and/or for a desired purpose. More specific examples of treatment operations include drilling operations, fracturing operations, gravel packing operations, wellbore clean out operations, acidizing operations, scale dissolution and removal, sand control operations, and consolidation operations.

Turning to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that is pumped to the upper end of tubing string 30 and flows through tubing string 30. Working fluid source 52 may supply any fluid utilized in wellbore operations, including without limitation, drilling fluid, slurry, acidizing fluid, liquid water, steam, hydraulic fracturing fluid, propane, nitrogen, carbon dioxide or some other type of fluid.

According to several exemplary embodiments, a method of treating a subterranean formation includes providing a treatment fluid including a thermosetting composition. The thermosetting composition includes water, one or more di- or tricarboxylic acids, and one or more epoxidized fatty acid esters. As used herein, a "thermosetting composition" refers to a composition that changes into a hard, insoluble polymer network (i.e., thermoset) upon curing. According to several exemplary embodiments, a method of treating a subterranean formation includes providing a treatment fluid including the formed thermoset.

According to several exemplary embodiments, water is present in the thermosetting composition in a range of about 0.01 to 50 percent based on the weight of the thermosetting composition. According to several exemplary embodiments, the one or more di- or tricarboxylic acids is present in the thermosetting composition in a range of about 0.01 to 50 percent based on the weight of the thermosetting composition. According to several exemplary embodiments, the one or more epoxidized fatty acid esters are present in the thermosetting composition in a range of about 0.01 to 30 percent based on the weight of the thermosetting composition.

Upon exposure to higher temperatures, the thermosetting compositions cure to form a hard thermoset. The thermoset includes an anhydride network of the one or more epoxidized fatty acid esters cross-linked with the one or more di- or tricarboxylic acids in water, and without use of a catalyst or toxic compounds. The thermoset possesses good thermal and mechanical properties and displays base catalyzed degradation. The thermoset can also be thermally degraded at higher temperatures. Moreover, the formed thermosets have a high glass transition temperature, degrade quickly, and provide a clean broken fluid. Advantageously, the thermosets are synthesized with bio-based materials.

A suitable fatty acid ester for use in the methods described herein includes the sucrose ester of fatty acids of soybean oil (i.e., epoxidized sucrose soyate). The chemical structure of epoxidized sucrose soyate (ESS) is provided below.

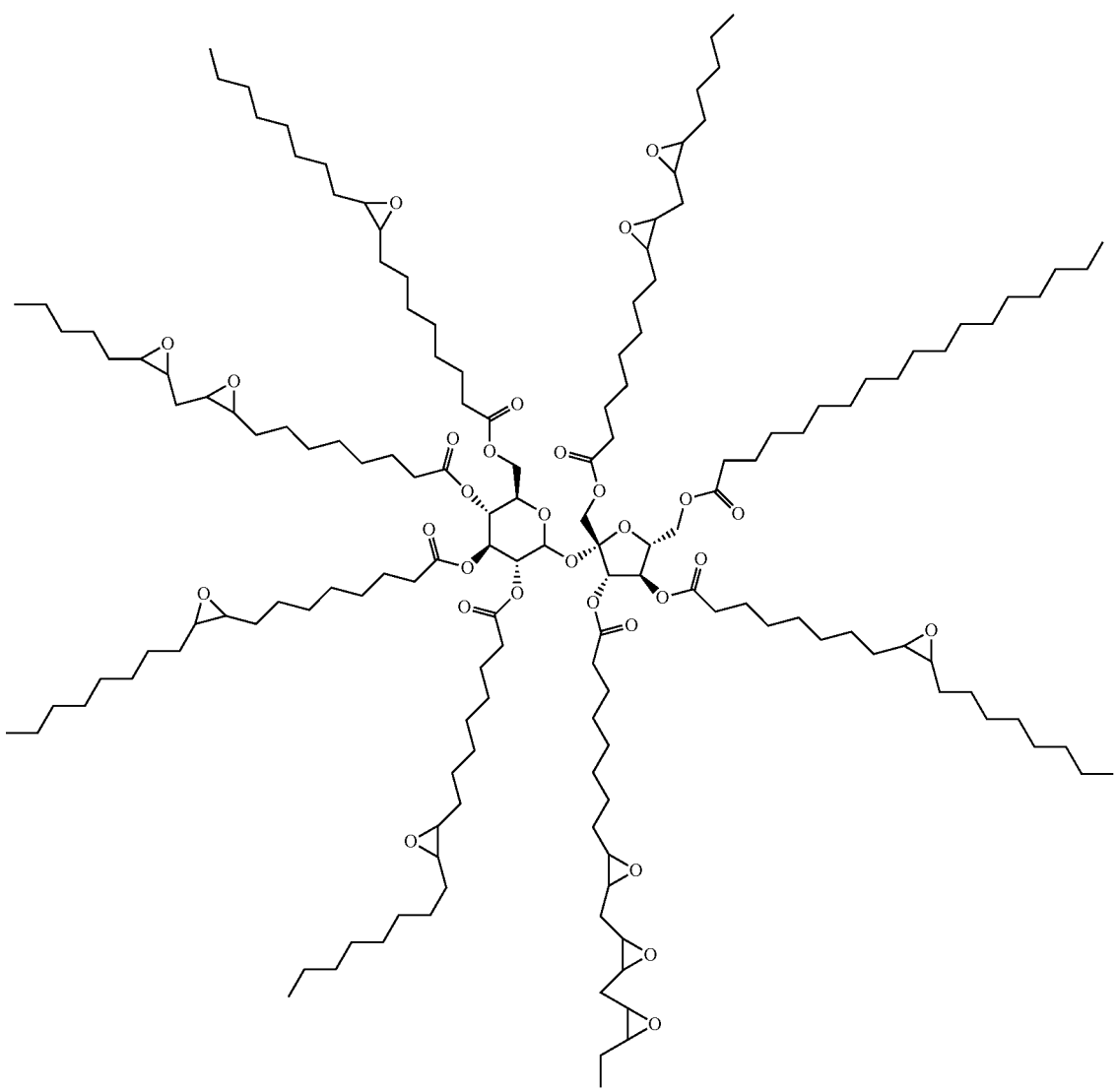

Epoxidized sucrose soyate (ESS)

Other suitable fatty acid esters include glycerol esters of fatty acids from a variety of plant oils. The chemical structure of an epoxidized glycerol fatty acid ester is provided below.

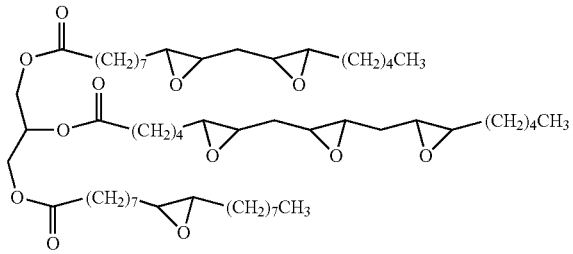

According to several exemplary embodiments, the plant oil is chosen from açaí oil, almond oil, amaranth oil, apple seed oil, apricot oil, argan oil, avocado oil, babassu oil, beech nut oil, ben oil, bitter gourd oil (from the seeds of *Momordica charantia*), black seed oil, blackcurrant seed oil (from the seeds of *Ribes nigrum*), borage seed oil (from the seeds of *Borago officinalis*), borneo tallow nut oil, bottle gourd oil (from the seeds of the *Lagenaria siceraria*), buffalo gourd oil (from the seeds of the *Cucurbita foetidissima*), butternut squash seed oil (from the seeds of *Cucurbita moschata*), camelina *sativa* oil, cape chestnut oil (yangu oil), carob pod oil, cashew oil, cocklebur oil, cocoa butter, coconut oil, cohune oil, coriander seed oil, corn oil, cottonseed oil, date seed oil, dika oil, egusi seed oil (from the seeds of *Cucumeropsis mannii naudin*), evening primrose oil (from the seeds of *Oenothera biennis*), flaxseed oil (from the seeds of *Linum usitatissimum*), grape seed oil, grapefruit seed oil, hazelnut oil, hemp oil, kapok seed oil, kenaf seed oil (from the seeds of *Hibiscus cannabinus*), *lallemantia* oil (from the seeds of *Lallemantia iberica*), linseed oil, macadamia oil, mafura oil (from the seeds of *Trichina emetic*), manila oil (from the kernel of *Sclerocarya birrea*), meadowfoam seed oil, mongongo nut oil (manketti oil), mustard oil, niger seed oil, okra seed oil, olive oil, orange oil, palm oil, *papaya* seed oil, peanut oil, pecan oil, pequi oil (from the seeds of *Caryocar brasiliense*), *perilla* seed oil, persimmon seed oil (from the seeds of *Diospyros virginiana*), pili nut oil (from the seeds of *Canarium ovatum*), pistachio oil, pomegranate seed oil, poppyseed oil, prune kernel oil, pumpkin seed oil, *quinoa* oil, ramtil oil (from *Guizotia abyssinica*, the *Niger* pea), rapeseed oil, rice bran oil, royle oil (from the seeds of *Prinsepia utilis*), safflower oil, sapote oil, seje oil (from the seeds of *Jessenia bataua*), sesame oil, shea butter, soybean oil, sunflower oil, taramira oil, tea seed oil (*Camellia* oil), thistle oil, tigernut oil (or nut-sedge oil), tobacco seed oil, tomato seed oil, walnut oil, watermelon seed oil, wheat germ oil, jatropha oil, one or more fractions thereof (e.g., one or more components of the oil), or a combination thereof.

According to several exemplary embodiments, the plant oil is chosen from agarwood oil, allspice oil, almond oil, anise oil, basil oil, bay leaf oil, benzoin oil, bergamot oil, buchu oil, camphor oil, *cannabis* oil, *cassia* oil, cedar oil, celery oil, chamomile oil, cinnamon oil, clary sage oil, clove oil, copaiba oil, cumin oil, *eucalyptus* oil, frankincense oil, galangal oil, geranium oil, ginger oil, grapefruit oil, guava oil, hops oil, hyssop oil, jasmine oil, juniper oil, lavender oil, lemon oil, lemongrass oil, lime oil, manuka oil, mandarin orange oil, marjoram oil, *melaleuca* oil, myrrh oil, nutmeg oil, orange oil, oregano oil, patchouli oil, peppermint oil, pine oil, rose oil, rosehip oil, rosemary oil, rosewood oil, sage oil, sandalwood oil, *sassafras* oil, spearmint oil, tangerine oil, tea tree oil, thyme oil, *tsuga* oil, valerian oil, vanilla oil, wintergreen oil, ylang-ylang oil, one or more fractions thereof (e.g., one or more components of the oil), or a combination thereof. According to several exemplary embodiments, the plant oil is chosen from soybean oil, linseed oil, a fraction thereof, or a combination thereof.

Suitable di- or tricarboxylic acids include citric acid; malic acid; tartaric acid; oxalic acid; malonic acid; glutaric acid; succinic acid; (E)-butenedioic acid; (Z)-butenedioic acid; oxobutanedioic acid; 2-oxopentanedioic acid; hexanedioic acid; prop-1-ene-1,2,3-tricarboxylic acid; 1-hydroxypropane-1,2,3-tricarboxylic acid; benzene-1,3,5-tricarboxylic acid; decanedioic acid; benzene-1,2,3,4,5,6-hexacarboxylic acid; isocitric acid; aconitic acid; propane-1,2,3-tricarboxylic acid; or a combination thereof.

Figure 2:
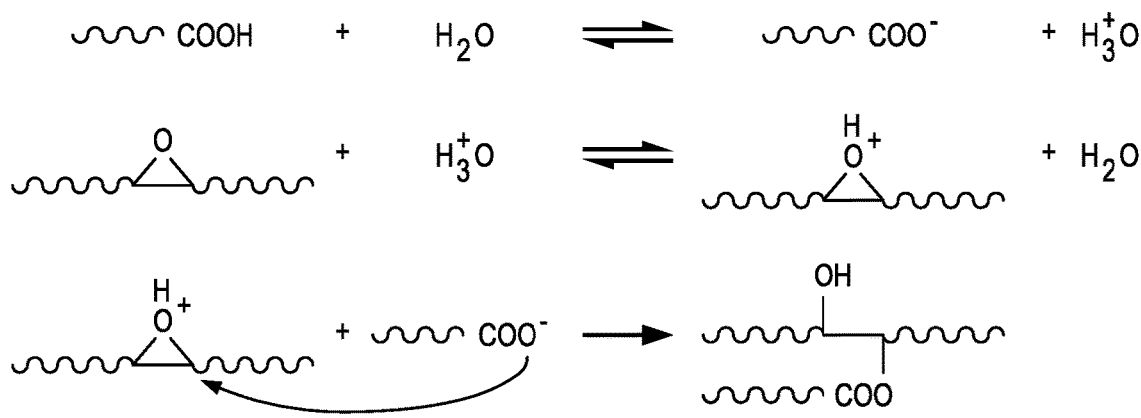
FIG. 2 illustrates the curing mechanism between an epoxidized fatty acid ester and a di- or tricarboxylic acid according to embodiments of the present invention.
Figure 2:
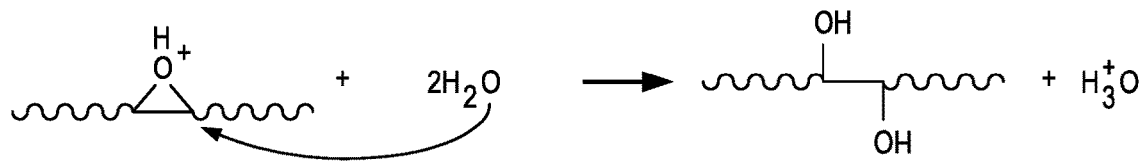
Figure 2:
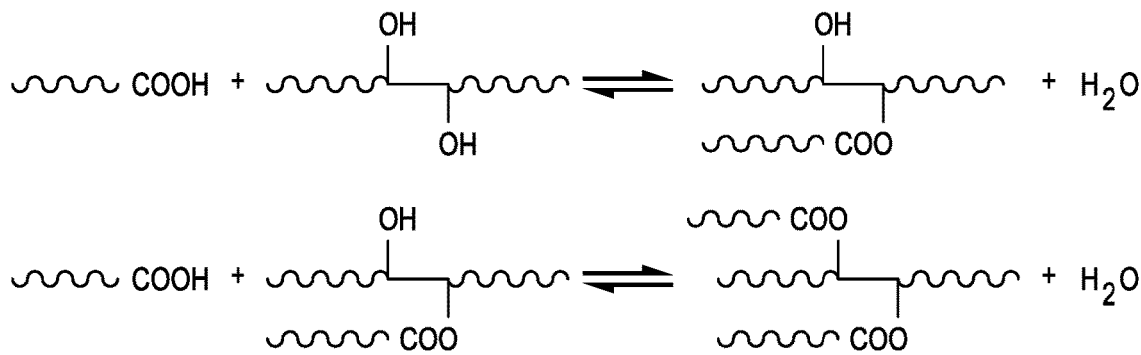
Figure 2:
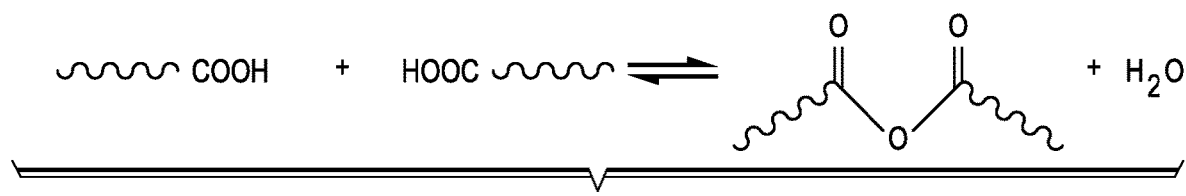

The curing mechanism between an epoxidized fatty acid ester and a di- or tricarboxylic acid is provided in FIG. 2. In particular, FIG. 2 illustrates the main curing reaction, the hydrolysis of epoxides, esterification, and the formation of the anhydride.

Table 1 provides thermosetting compositions including ESS and a variety of acids.

TABLE 1

Pre-Reaction and Curing Conditions*

| Sample | Acid | Epoxy/Acid/H$_2$O (molar ratio) | Prereaction Condition | Curing Condition |
| --- | --- | --- | --- | --- |
| E-C1 | Citric acid | 1/1/1.5 | 80° C./1 h | 80° C./3 h, 120° C./1 h; 150° C./2 h |
| E-C0.8 | Citric acid | 1/0.8/1.2 | 80° C./1 h | 80° C./3 h, 120° C./1 h; 150° C./2 h |
| E-C0.65 | Citric acid | 1/0.65/0.975 | 80° C./1 h | 80° C./3 h, 120° C./1 h; 150° C./2 h |
| E-C0.5 | Citric acid | 1/0.5/0.75 | 80° C./1 h | 80° C./3 h, 120° C./1 h; 150° C./2 h |
| E-C0.35 | Citric acid | 1/0.35/0.525 | 80° C./30 min | 80° C./3 h, 120° C./1 h; 150° C./2 h |
| E-C0.2 | Citric acid | 1/0.2/0.3 | 80° C./30 min | 80° C./3 h, 120° C./1 h; 150° C./2 h |
| E-M | Malic acid | 1/1/1.5 | 80° C./100 min | 80° C./3 h, 120° C./1 h; 150° C./2 h |
| E-T | Tartaric acid | 1/1/2.0 | 80° C./110 min | 80° C./3 h, 120° C./1 h; 150° C./2 h |
| E-ML | Malonic acid | 1/1/1.5 | 70° C./20 min | 70° C./3 h, 120° C./1 h; 150° C./2 h |
| E-G | Glutaric acid | 1/1/1 | 90° C./2 h | 90° C./3 h, 120° C./1 h; 150° C./2 h |

E = ESS;
C = citric acid;
M = malic acid;
T = tartaric acid;
ML = malonic acid;
G = glutaric acid Table 2 provides the thermal and mechanical properties of the thermosets formed from natural acid cross-linked ESS networks.

TABLE 2

Properties of ESS Thermosets*

| Sample | $T_g$ (° C.) | Modulus at 25° C. (MPa) | Modulus at $T_g$ + 60° C. (MPa) | Cross-Linking Density (mol/m$^3$) |
|---|---|---|---|---|
| E-C1 | 96 | 944 | 32.0 | 2997 |
| E-C0.8 | 91 | 908 | 24.2 | 2288 |
| E-C0.65 | 93 | 865 | 25.9 | 2439 |
| E-C0.5 | 79 | 532 | 27.5 | 2677 |
| E-C0.35 | 63 | 358 | 26.9 | 2725 |
| E-C0.2 | 9 | 20.0 | 7.39 | 865 |
| E-M | 66 | 696 | 10.1 | 1016 |
| E-T | 95 | 874 | 36.5 | 3415 |
| E-ML | 23 | 39.6 | 8.60 | 969 |
| E-G | 17 | 1.82 | 0.705 | 81 |

Table 3 provides the degradation time of the thermosets in different concentrations of sodium hydroxide (NaOH) aqueous solution in different conditions.

TABLE 3

Degradation Time*

| | Degradation Time at 90° C. | | | Degradation time at Room Temperature |
|---|---|---|---|---|
| Sample | 0.1M | 1M | 10M | 1M |
| E-C1 | 1150 min | 39 min | ~25 min | 2 days |
| E-C0.8 | 1270 min | 56 min | ~25 min | 4 days |
| E-C0.65 | 2710 min | 103 min | ~45 min | 6 days |
| E-C0.5 | ~3 days | 182 min | ~45 min | 44 days |
| E-C0.35 | ~3 days | 224 min | ~45 min | >60 days |
| E-C0.2 | ~3 days | 167 min | 20-30 min | 32 days |
| E-M | 384 min | 19 min | ~15 min | 1 day |
| E-T | 523 min | 34 min | ~15 min | 2 days |
| E-ML | ~3 days | 235 min | 20-30 min | >60 days |
| E-G | 87 min | 13 min | 10 min | 1 day |

*Data from Tables 1-3 taken from Songqui Ma et al., *Naturally Occurring Acids as Cross-Linkers To Yield VOC-Free, High-Performance, Fully Bio-Based, Degradable Thermosets*, DOI: 10.1021/acs.macromol.5b01923, Sep. 30, 2015.

The degradation times in 0.1 M and 1 M NaOH aqueous solutions are the times for the samples to be completely dissolved or for forming a dispersion in the solutions (transparent solutions or emulsions without obvious particles or small pieces). The degradation times in 10 M NaOH aqueous solution are the times for the samples to be broken down into smaller pieces.

The rate of degradation of the thermosets depends on the strength of the alkaline solution. In a 10 M solution, degradation is extremely fast, whereas with use of a 1 M solution, it takes about 20 minutes to 4 hours depending on the cross-linker used. Thermosets exposed to fluids having a pH in the range of about 9-12 (e.g., fracturing fluids) will take longer than 4 hours to degrade.

Figure 3:
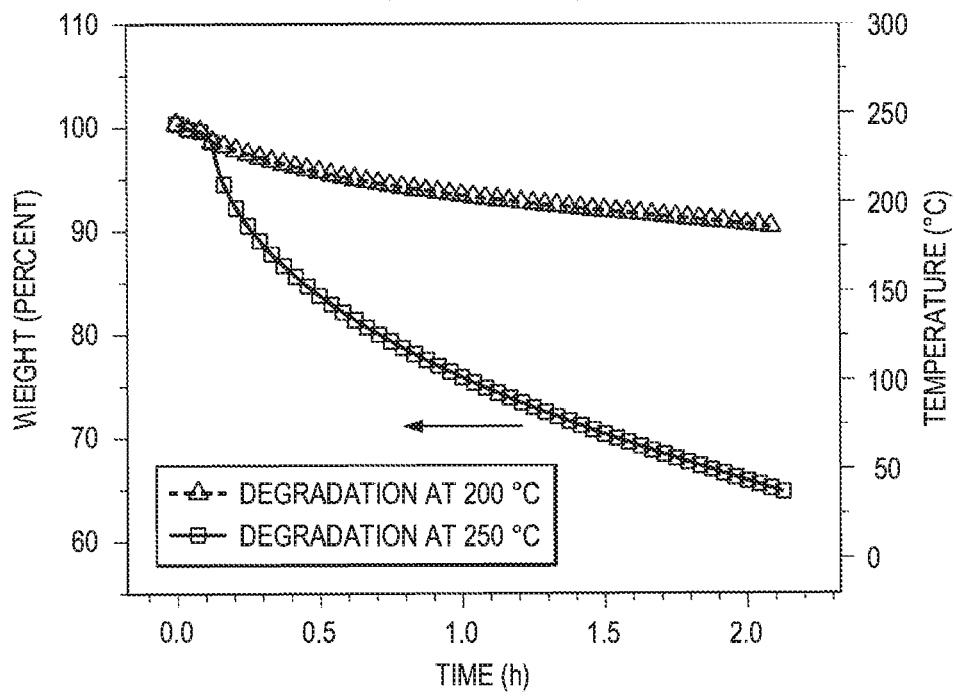
FIG. 3 illustrates the thermal degradation of a thermoset according to embodiments of the present invention.

FIG. 3 illustrates the thermal degradation of the E-C1 thermoset sample. The graph is taken from Songqui Ma et al., cited supra. As can be seen, the sample degrades faster as the temperature increases.

Figure 4:
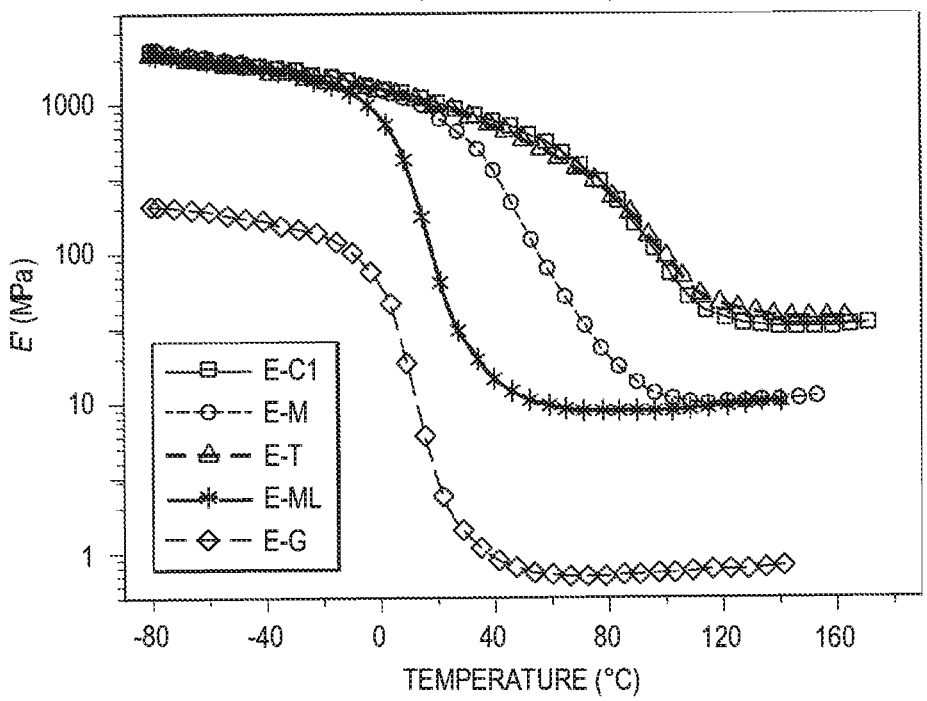
FIG. 4 illustrates the storage modulus of various thermosets at different temperatures according to embodiments of the present invention.

The thermosets have a high storage modulus, and maintain stability even at high temperatures. FIG. 4 illustrates the storage modulus versus temperature of various thermosets. The graph is taken from Songqui Ma et al., cited supra. The storage modulus is an ability to store deformation energy in an elastic manner. This is directly related to the extent of cross-linking. The higher the degree of cross-linking, the greater the storage modulus. In the present case, the storage modulus is a function of cross-linking density, and hence depends on the type of acid and the concentration of acid used for cross-linking. Accordingly, the storage modulus of ESS can be tuned based on the desired storage modulus. By varying the concentration of the acid, a highly cross-linked rigid thermoset network can be produced that can withstand high stress conditions at high temperatures. Therefore, the thermosets can be used for diversion of fluids, as well as for keeping proppant pillars apart in the fractured zone.

According to several exemplary embodiments, the thermosetting compositions described herein (and their corresponding thermosets) may be used in different treatment operations. According to several exemplary embodiments, the thermosetting compositions are mixed in situ downhole in wells having a temperature above 120° C. At these temperatures, the thermosets are formed at a fast rate. According to several exemplary embodiments, at temperatures of greater than 120° C., the thermosetting compositions can be pumped directly into a formation without use of a carrier fluid.

According to several exemplary embodiments, the thermosetting compositions are mixed at the surface to form thermosets (e.g., thermoset particulates) having a specific size and shape, the thermoset particulates are added to a treatment fluid (e.g., a carrier fluid), and then the treatment fluid with the thermoset particulates is introduced downhole in wells having lower temperatures (e.g., less than or equal to 100° C.).

According to several exemplary embodiments, a suitable carrier fluid for the thermoset particulates includes a fracturing fluid. Any fluid suitable as a fracturing fluid for use in a fracturing or frac-packing application may be used, including aqueous gels, viscoelastic surfactant gels, oil gels, foams, and emulsions. Suitable aqueous gels include water and one or more gelling agents. Suitable foams include two immiscible liquids such as an aqueous gelled liquid and a normally gaseous fluid, such as carbon dioxide or nitrogen, and suitable emulsions include two immiscible fluids, such as a hydrocarbon and a gelled aqueous liquid.

According to several exemplary embodiments, the fracturing fluids are aqueous gels that include water, a gelling agent for gelling the water and increasing its viscosity, and, optionally, a cross-linking agent for cross-linking the gel and further increasing the viscosity of the fluid. The increased viscosity of the gelled, or gelled and cross-linked, fracturing fluid reduces fluid loss and allows the fracturing fluid to transport significant quantities of suspended proppant particles and/or thermoset particulates. The water used to form the fracturing fluid may be salt water, brine, or any other aqueous liquid that does not adversely react with the other components. The density of the water can be increased to provide additional particle transport and suspension.

According to several exemplary embodiments, a variety of gelling agents are used, including hydratable polymers that contain one or more functional groups such as hydroxyl, carboxyl, sulfate, sulfonate, amino, or amide groups. Suitable gelling agents typically include biopolymers, synthetic polymers, or a combination thereof. A variety of gelling agents can be used, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. According to several exemplary embodiments, the gelling agents may include biopolymers including polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethyl hydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. Suitable gelling agents generally are present in the fracturing fluid in an amount in the range of from about 0.1% to about 5% by weight of the water therein. According to several exemplary embodiments, the gelling agents are present in the fracturing fluids in an amount in the range of from about 0.01% to about 2% by weight of the water therein.

According to several exemplary embodiments, cross-linking agents may be used to cross-link gelling agent molecules to form cross-linked gelling agents. Cross-linkers typically include at least one metal that is capable of cross-linking at least two gelling agent molecules. Examples of suitable cross-linkers include, but are not limited to, zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. The cross-linker also may include a boron containing compound. Examples of suitable boron-containing cross-linkers include, but are not limited to, boric acid, disodium octaborate tetrahydrate, sodium diborate, pentaborates, ulexite and colemanite. Suitable cross-linkers generally are present in the fracturing fluid in an amount sufficient to provide the desired degree of cross-linking between gelling agent molecules. According to several exemplary embodiments, the cross-linkers are present in an amount in the range from about 0.001% to about 10% by weight of the water in the fracturing fluid. According to several exemplary embodiments, the cross-linkers are present in the fracturing fluid in an amount in the range from about 0.01% to about 1% by weight of the water therein. Persons of ordinary skill in the art, with the benefit of this disclosure, will recognize the exact type and amount of cross-linker to use depending on factors such as the specific gelling agent, desired viscosity, and formation conditions.

According to several exemplary embodiments, the gelled or gelled and cross-linked fracturing fluids may also include internal delayed gel breakers such as an enzyme, oxidizing, acid buffer, or temperature-activated gel breakers. The gel breakers cause the viscous carrier fluids to revert to thin fluids that can be produced back to the surface after they have been used to place proppant particles and/or thermoset particulates in subterranean fractures. According to several exemplary embodiments, the gel breaker used is typically present in the fracturing fluid in an amount in the range of from about 0.5% to about 10% by weight of the gelling agent. The fracturing fluids may also include one or more of a variety of well-known additives, such as gel stabilizers, fluid loss control additives, clay stabilizers, bactericides, and the like.

According to several exemplary embodiments, the thermosetting compositions (or their corresponding thermosets) are used to enhance fluid flow from a subterranean formation. According to several exemplary embodiments, the thermosetting compositions are used to enhance the permeability of proppant matrices within fractures so that fluids from the subterranean formation may flow more freely to the wellbore without negatively affecting the ability of the proppant matrix to perform other desired functions within the fracture, e.g., maintaining the integrity of a fracture or providing a sand control means.

According to several exemplary embodiments, the thermosetting compositions are used to enhance fracture conductivity. In this exemplary method, a pad fluid is first injected into the wellbore to initiate fractures in a subterranean formation. Next, a fracturing fluid laden with resin-coated proppant particles (e.g., resin-coated sand) is introduced into the formation for proppant pillar formation. The thermosetting composition is then pumped into the wellbore. The resin on the proppant particles cures, and the proppant particles consolidate within a fracture in the formation to form a proppant matrix. The thermosetting composition becomes distributed throughout the proppant matrix as the proppant matrix forms, and hardens to form a thermoset.

According to several exemplary embodiments, another proppant-laden stage is introduced into the formation for proppant pillar formation after the thermosetting composition is introduced. In this way, the thermosetting composition acts as a spacer fluid between two proppant-laden stages to keep the proppant-laden stages separate.

According to several exemplary embodiments, the thermoset particulates are produced at the surface, and the thermoset particulates are then mixed at the surface with a carrier fluid, which can be an alkaline fracturing fluid (e.g., Delta Frac® fracturing fluid, Suricco$^{SM}$ fluid systems, and Hybor™ fracturing fluid, all commercial available from Halliburton Energy Services, Inc.). The carrier fluid with the thermoset particulates are then introduced to the formation. The fracturing fluid, being alkaline, can degrade the thermoset particulates after a certain amount of time. According to several exemplary embodiments, an additional stage of alkaline fluid (e.g., fracturing fluid) is introduced into the formation when the thermosets are generated in situ.

Advantageously, the thermoset degrades in the presence of a basic fluid, causing the thermoset to be substantially removed from the proppant matrix. The proppant matrix, however, is not affected by the basic fluid. As a result, voids are created in the proppant matrix. These voids enhance the permeability of the matrix, which results in enhanced conductivity. Enhanced fracture conductivity enhances well productivity.

According to several exemplary embodiments, the proppant particles forming the proppant matrix are used in conjunction with any suitable fracturing fluid, for example, the fracturing fluids described above. Any proppant particle suitable for use in subterranean applications is suitable for use in the methods described herein. For instance, natural sand, ground walnut hulls, man-made proppants, including bauxite, ceramics, or polymeric materials, are suitable. Suitable sizes range from 4 to 100 U.S. mesh, for example in the range of 10 to 60 U.S. mesh.

According to several exemplary embodiments, the proppant particles are coated with a curable resin. The proppant particles can either be precoated or coated on-the-fly with a curable resin. Any type of curable resin that enables the proppant particles to consolidate within a fracture in the formation is suitable for use, e.g., epoxies, furan, phenolics, furfuryl aldehyde, furfuryl alcohol, or mixtures thereof. Any portion of the proppant particles may be coated with a curable resin. For instance, just the tail-end portion, the first portion and the tail-end portion, or the entirety of the proppant particles may be coated. According to several exemplary embodiments, at least a majority of the proppant particles are coated with curable resin and allowed to consolidate in situ to form a hardenable mass.

According to several exemplary embodiments, the proppant particles consolidate within a fracture in the formation to form a proppant matrix. The term "proppant matrix" as used herein refers to a consolidation of proppant particles within a fracture adjacent to a wellbore in a subterranean formation. The mechanism by which the proppant matrix consolidates within the fracture is by any suitable method, e.g., a curable resin and/or interlocking proppant particles.

According to several exemplary embodiments, the thermosetting composition becomes distributed throughout the proppant matrix uniformly as the proppant matrix forms, and then hardens to form a thermoset within the proppant matrix. According to several exemplary embodiments, thermoset particulates are distributed throughout the proppant matrix and are incorporated in the proppant matrix as the resin on the proppant particles cures.

According to several exemplary embodiments, the removal of the thermoset occurs after the proppant matrix has developed some substantial compressive strength or stability inside the fracture to minimize shifting or rearrangement of proppant particulates within the pack. According to several exemplary embodiments, the concentration of the thermoset in the proppant matrix ranges from about 0.1% to about 30% (e.g., about 1% to about 5%), based on the weight of the proppant in the proppant matrix.

According to several exemplary embodiments, the thermoset undergoes an irreversible degradation when exposed to higher temperatures and/or an alkaline fluid. This degradation, in effect, causes the thermoset to substantially be removed from the proppant matrix. As a result, voids are created in the proppant matrix. These voids enhance the permeability of the matrix, which results in enhanced conductivity. Enhanced fracture conductivity enhances well productivity, as well productivity is a function of fracture conductivity.

According to several exemplary embodiments, the thermoset degrades slowly over time as opposed to instantaneously. According to several exemplary embodiments, the thermoset does not begin to degrade until after the proppant matrix has developed some compressive strength. The slow degradation of the thermoset helps to maintain the stability of the proppant matrix.

According to several exemplary embodiments, the specific features of the thermoset may be chosen or modified to provide the proppant matrix with optimum conductivity while maintaining its desirable filtering capability. According to several exemplary embodiments, the thermoset is selected to have a size and shape similar to the size and shape of the curable proppant particles to help maintain substantial uniformity. The thermoset may have any shape, depending on the desired characteristics of the resultant voids in the proppant matrix including, but not limited to, particulates having the physical shape of platelets, shavings, flakes, ribbons, rods, strips, spheroids, toroids, pellets, tablets, or any other physical shape. The physical shape of the thermoset can be chosen so as to enhance the desired shape and relative composition of the resultant voids within the proppant matrix. For example, a rod-like particle shape may be suitable in applications wherein channel-like voids in the proppant matrix are desired. One of ordinary skill in the art with the benefit of this disclosure will recognize the thermoset and the preferred size and shape for a given application.

According to several exemplary embodiments, the thermosetting compositions are used for diversion of fluids in a wellbore. A diverting agent is capable of altering some or all of the flow of a fluid from a particular zone of a subterranean formation to another zone of the subterranean formation. Diverting agents may, for example, selectively enter more permeable zones of a subterranean formation, where they create a relatively impermeable barrier across the more permeable zones of the formation (including bridging one or more fractures). The diverting agents thus serve to divert a subsequently introduced treatment fluid into the less permeable portions of the formation. According to several exemplary embodiments, this may allow for the creation or enhancement of additional fractures by subsequently-introduced treatment fluid. According to several exemplary embodiments, creation or enhancement of additional fractures may include connecting already created or already existing fractures.

According to several exemplary embodiments, the thermosetting compositions are used to divert a treatment fluid (e.g., a fracturing or other stimulation fluid such as an acidizing fluid) into a portion of a wellbore. According to several exemplary embodiments, the fracturing or stimulation fluid may enter flowpaths and perform its intended function of increasing the production of a desired resource from that portion of the wellbore. The level of production from the portion of the wellbore that has been stimulated may taper off over time such that stimulation of a different portion of the well is desirable. Additionally or alternatively, previously formed flowpaths may need to be temporarily plugged in order to fracture or stimulate additional/alternative intervals or zones during a given wellbore treatment.

According to several exemplary embodiments, an amount of a thermosetting composition (or a thermoset) sufficient to effect diversion of a treatment fluid from a first flowpath to a second flowpath is delivered to the wellbore. The thermosetting composition or thermoset may form a temporary plug, also known as a diverter plug or diverter cake, once disposed within the first flowpath, which restricts entry of a treatment fluid (e.g., fracturing or stimulation fluid) into the first flowpath. The diverter plug deposits onto the face of the formation and creates a temporary skin or structural, physical and/or chemical obstruction that decreases the permeability of the zone. The treatment fluid that is restricted from entering the first flowpath enters one or more additional flowpaths and performs its intended function. Within a first treatment stage, the process of introducing a treatment fluid into the formation to perform an intended function (e.g., fracturing or stimulation) and, thereafter, diverting the treatment fluid to another flowpath in the formation and/or to a different location or depth within a given flowpath may be continued until some user and/or process goal is obtained. According to several exemplary embodiments, this diverting procedure is repeated with respect to each of a second, third, fourth, fifth, sixth, or more, treatment stages, for example, as disclosed herein with respect to the first treatment stage.

According to several exemplary embodiments, the treatment operation being performed is a fracturing operation, wherein a fracturing fluid is placed (e.g., pumped downhole) at a first location in the formation and the thermosetting composition (or thermoset) is employed to divert the fracturing fluid from the first location to a second location in the formation such that fracturing can be carried out at a plurality of locations. The thermosetting composition or thermoset may be placed into the first (or any subsequent location) via pumping the thermosetting composition downhole and/or by adding thermosets directly to the fracturing fluid. The thermosetting composition or thermoset may form a diverter plug at the first location (and any subsequent location so treated) such that the fracturing fluid may be selectively placed at one or more additional locations, for example during a multi-stage fracturing operation.

According to several exemplary embodiments, the thermosetting compositions are introduced into the formation in alternating intervals. For example, a fracturing fluid may first be pumped into the wellbore to create fractures in the formation. Next, a thermosetting composition is introduced into the formation and allowed to set in the fractures to form a thermoset to temporarily divert subsequently introduced fluid. A fracturing fluid is then pumped into the formation to create additional fractures in the formation. The fracturing fluid is diverted away from the initially created fractures. The additional fractures are then stimulated to produce hydrocarbons. A thermosetting composition is then introduced again to temporarily plug the additional fractures. This cycle can be repeated any number of times.

According to several exemplary embodiments, alternate introduction of the fluids may be achieved through a fluid pumping strategy such as pump cycling. Pump cycling may include pumping or otherwise introducing alternate intervals of (i) a treatment fluid, such as a fracturing fluid that includes a base fluid and proppant particles and (ii) a thermosetting composition or a carrier fluid including thermoset particulates, into the subterranean formation and/or wellbore penetrating the subterranean formation.

According to several exemplary embodiments, pump cycling includes any suitable means of accomplishing the alternating introduction of the interval fluids. According to several exemplary embodiments, it may include alternating the fluid fed (e.g., alternating between the treatment fluid and thermosetting composition) into a single pump for pumping treatment fluid downhole (e.g., down casing, tubing, and/or a wellbore penetrating a subterranean formation and then out into the subterranean formation). According to several exemplary embodiments, pump cycling may include using two or more pumps, each pumping an interval of fluid downhole in alternating succession. For example, where two pumps are used, a first pump fed by a reservoir of fracturing fluid may be cycled on, then cycled off at substantially the same time that a second pump fed by a reservoir of a thermosetting composition is cycled on. Then, the second pump may be cycled off at substantially the same time that the first pump is cycled back on again, and so on, such that the end result is the introduction of alternating intervals of fluids into the subterranean formation. According to several exemplary embodiments, a fracturing fluid may be continuously pumped into the subterranean formation for substantially the entire duration of a fracturing treatment, while the thermosetting composition may be intermittently injected into the fracturing fluid, so as to result in alternating sequences of (i) a fracturing fluid and (ii) a thermosetting composition being introduced into the wellbore and/or the subterranean formation. According to several exemplary embodiments, a continuous stream of the thermosetting composition may be pumped into the subterranean formation, with intervals of a fracturing fluid injected into the thermosetting composition stream, achieving a similar effect of alternating sequences of fracturing fluid and thermosetting composition introduced into the wellbore and/or the subterranean formation.

According to several exemplary embodiments, the duration of each interval may be approximately 30 seconds. According to several exemplary embodiments, the duration of each interval may be any single time period within a range of time, such range having a lower end of approximately any one of 5, 10, 15, 20, 25, 30, 35, 40, 45, 50, 55, 60, and 65 seconds, and an upper range of approximately any one of 30, 35, 40, 45, 50, 55, 60, 65, 70, 75, 80, 85, 90, 95, 100, 105, 110, 115, 120, 125, 130, and 135 seconds, and so on up to 300 seconds in increments of 5 seconds. Thus, the duration of each interval may be, for example, about 5 to about 60 seconds; about 5 to about 55 seconds; about 5 to about 50 seconds, etc. By way of further example, the duration of each interval may in other embodiments be from about 15 to about 50 seconds; from about 20 to about 45 seconds; from about 25 to about 35 seconds; from about 30 to about 50 seconds; from about 50 to about 135 seconds; from about 50 to about 250 seconds, etc. According to several exemplary embodiments, interval time duration ranges having any other combination of upper and lower end are also suitable. In addition, according to several exemplary embodiments, interval durations may be varied during a treatment. For instance, a first interval may be of a first duration (e.g., about 30 seconds), and a second interval (whether immediately or indirectly following the first interval) may be of a second duration different from the first (e.g., about 100 seconds). According to several exemplary embodiments, the duration of intervals may increase during a treatment with respect to previous intervals. For example, a first interval and/or a first set of intervals may be of a first duration, and a second interval and/or second set of intervals may be of a second, longer, duration. Even further, according to several exemplary embodiments, a third interval and/or set of intervals having a third duration, longer than the second may be included. According to several exemplary embodiments, the duration of one or more intervals may increase as a fracture network (e.g., a series of connected fractures in the formation) around the wellbore grows in length and/or exposed area.

According to several exemplary embodiments, the thermosetting compositions are used to divert fluid within a fracture. For example, the thermosetting compositions may divert fluid from one portion of a fracture to another portion of the fracture to create secondary or additional fractures within the fracture. The secondary fractures may connect pre-existing fractures to create a complex fracture network.

According to several exemplary embodiments, the introduction of alternating intervals of a treatment fluid and the thermosetting composition is used to divert fluid away from a bridged fracture so as to create or enhance additional fractures, which may include linking pre-existing fractures in the subterranean formation (e.g., previously-created fractures or naturally existing fractures). Cyclical pulsing of a treatment fluid (e.g., a fracturing fluid) and the thermosetting composition may continue for any number of iterations as desired, with compounding propping and bridging effects that may result in diversion over several different orders of magnitude, and/or deeper fracture penetration of the formation, and/or enhanced complexity of a fracture matrix within the formation (e.g., creation of more and more connections between fractures in the formation, forming a fracture network). According to several exemplary embodiments, the methods described herein create greater connected fracture surface area (e.g., through creation and/or enhancement of a greater number of connecting fractures), thereby creating, in some instances, more complex fracture matrices in a subterranean formation.

According to several exemplary embodiments, additionally or alternatively to acting as diverting agents, the thermosetting compositions are used to control fluid loss of a fluid into a subterranean formation from a wellbore penetrating the subterranean formation. The term "fluid loss," as used herein, relates to the loss of volume of a treatment fluid to a portion of the subterranean formation through, for example, the pore space or the natural fractures of the formation that surrounds a wellbore or a hydraulic fracture.

According to several exemplary embodiments, the thermosetting compositions act to at least partially control fluid migration within the subterranean formation. According to several exemplary embodiments, the thermosetting compositions enable a seal to form across an entire area of placement in a subterranean formation.

According to several exemplary embodiments, the thermosetting compositions are introduced into a zone of high permeability and allowed to cure to bridge the zone of high permeability. In this way, fluid loss through the zone of high permeability is avoided or reduced.

Figure 5:
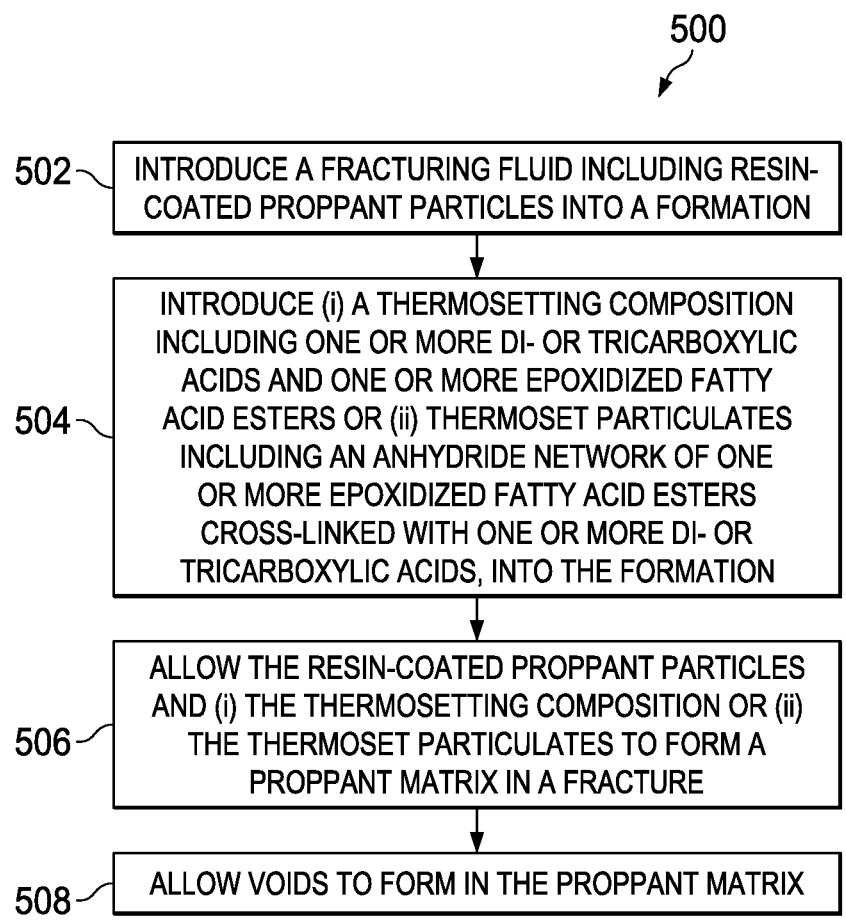
FIG. 5 depicts a method of enhancing fluid flow from a subterranean formation according to embodiments of the present invention.

According to several exemplary embodiments, a method of enhancing fluid flow from a subterranean formation is provided. Turning now to FIG. 5, the method 500 includes introducing a fracturing fluid including resin-coated proppant particles into the formation in step 502, introducing (i) a thermosetting composition including one or more di- or tricarboxylic acids and one or more epoxidized fatty acid esters or (ii) thermoset particulates including an anhydride network of one or more epoxidized fatty acid esters cross-linked with one or more di- or tricarboxylic acids, into the formation in step 504, allowing the resin-coated proppant particles and (i) the thermosetting composition or (ii) the thermoset particulates to form a proppant matrix in a fracture in step 506, and allowing voids to form in the proppant matrix in step 508. The term "introducing," as used herein, includes pumping, injecting, pouring, releasing, displacing, spotting, circulating, or otherwise placing a fluid or material within a well, wellbore, or subterranean formation using any suitable manner known in the art.

Figure 6:
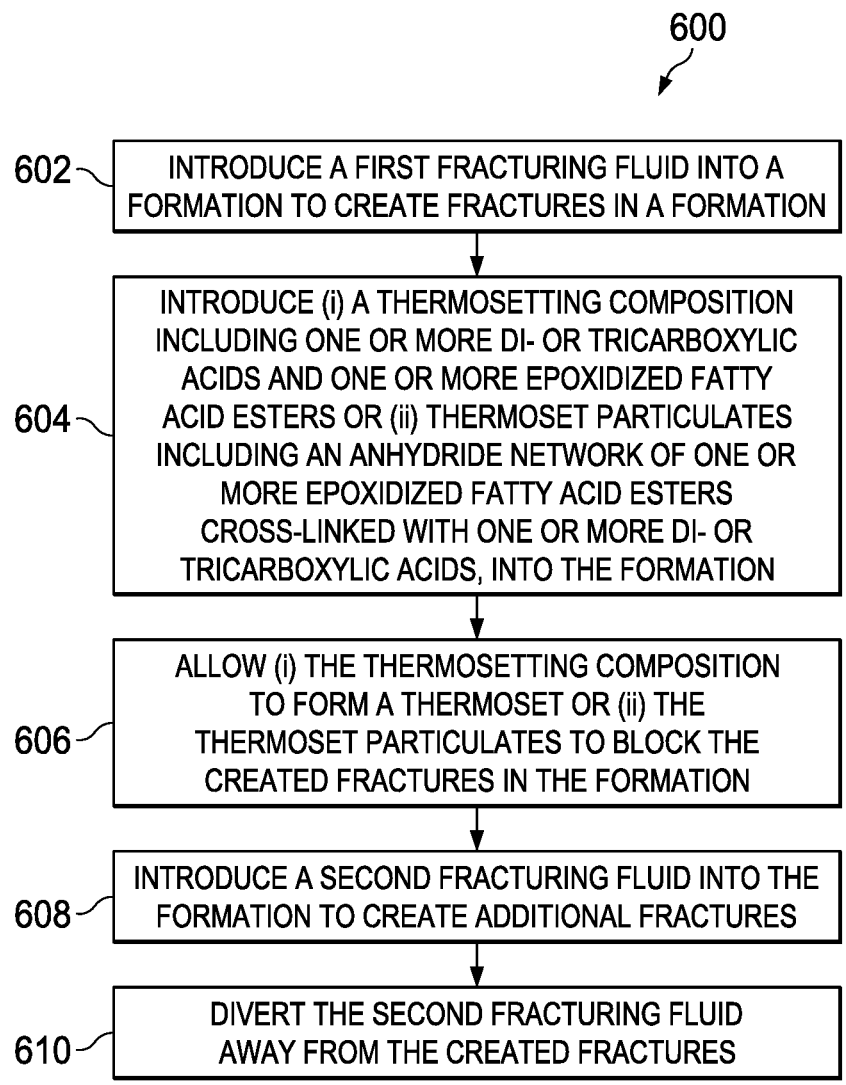
FIG. 6 depicts a method of diverting a treatment fluid in a subterranean formation according to embodiments of the present invention.

According to several exemplary embodiments, a method of diverting a treatment fluid in a subterranean formation is provided. Turning now to FIG. 6, the method 600 includes introducing a first fracturing fluid into the formation to create fractures in the formation in step 602, introducing (i) a thermosetting composition including one or more di- or tricarboxylic acids and one or more epoxidized fatty acid esters or (ii) thermoset particulates including an anhydride network of one or more epoxidized fatty acid esters cross-linked with one or more di- or tricarboxylic acids, into the formation in step 604, allowing (i) the thermosetting composition to form a thermoset, or (ii) the thermoset particulates, to block the created fractures in the formation in step 606, introducing a second fracturing fluid into the formation to create additional fractures in step 608, and diverting the second fracturing fluid away from the created fractures in step 610.

Figure 7:
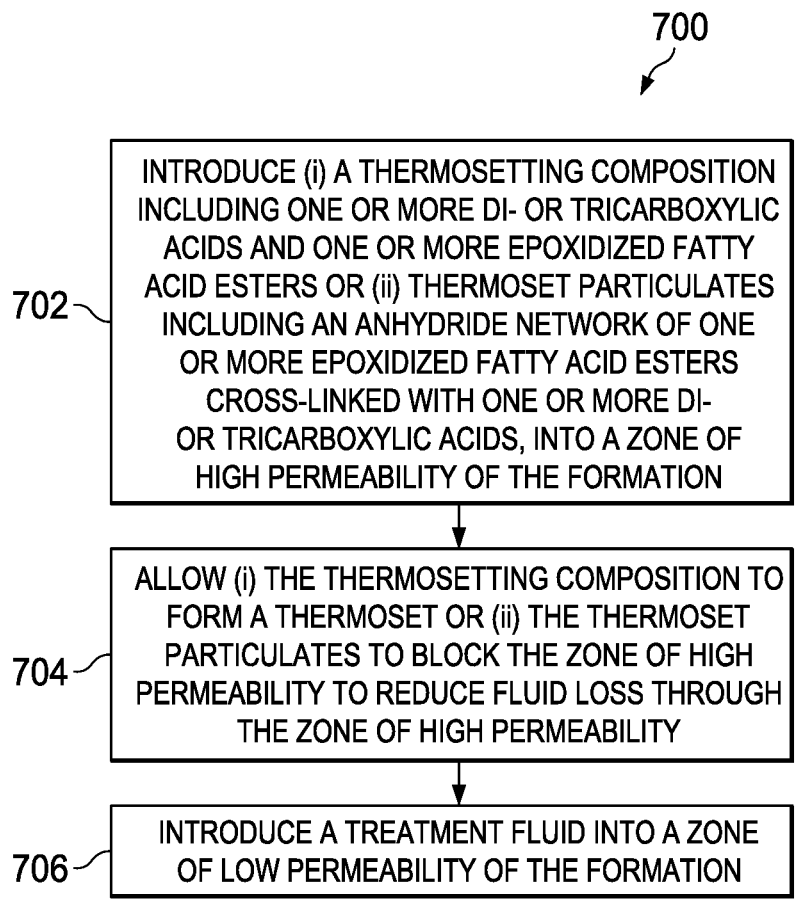
FIG. 7 depicts a method of controlling fluid loss in a subterranean formation according to embodiments of the present invention.

According to several exemplary embodiments, a method of controlling fluid loss in a subterranean formation is provided. Turning now to FIG. 7, the method 700 includes introducing (i) a thermosetting composition including one or more di- or tricarboxylic acids and one or more epoxidized fatty acid esters or (ii) thermoset particulates including an anhydride network of one or more epoxidized fatty acid esters cross-linked with one or more di- or tricarboxylic acids, into a zone of high permeability of the formation in step 702, allowing (i) the thermosetting composition to form a thermoset, or (ii) the thermoset particulates, to block the zone of high permeability to reduce fluid loss through the zone of high permeability in step 704, and introducing a treatment fluid into a zone of low permeability of the formation in step 706.

The following examples are illustrative of the compositions and methods discussed above and are not intended to be limiting.

Example 1

Effect of Alkaline pH on Resin-Coated Proppant Pillar

To evaluate the effect of fracturing fluid having higher alkaline pH on resin-coated sand, sand cubes cured with SandTrap® resin were soaked in (1) water having a pH of 12 at 90° C. for 4 hours and (2) 1 M NaOH solution at 90° C. for 4 hours.

It was seen that after 4 hours, the resin cured sand cubes were not affected by the alkaline fluid. Hence, the thermosets can be used as degradable material without affecting the proppant particles.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of enhancing fluid flow from a subterranean formation, comprising:
introducing a fracturing fluid comprising resin-coated proppant particles into the formation;
introducing (i) a thermosetting composition comprising one or more di- or tricarboxylic acids and one or more epoxidized fatty acid esters or (ii) thermoset particulates comprising an anhydride network of one or more epoxidized fatty acid esters cross-linked with one or more di- or tricarboxylic acids, into the formation;
allowing the resin-coated proppant particles and (i) the thermosetting composition or (ii) the thermoset particulates to form a proppant matrix in a fracture, wherein the thermosetting composition or the thermoset particulates are present in the proppant matrix in an amount of about 0.1 to 30 percent by weight of the resin-coated proppant particles in the proppant matrix; and
allowing voids to form in the proppant matrix.

2. The method of claim 1, wherein the thermosetting composition further comprises water, and
the water is present in the thermosetting composition in an amount of about 0.01 to 50 percent by weight of the thermosetting composition;
the one or more di- or tricarboxylic acids is present in the thermosetting composition in an amount of about 0.01 to 50 percent by weight of the thermosetting composition; and
the one or more epoxidized fatty acid esters is present in the thermosetting composition in an amount of about 0.01 to 30 percent by weight of the thermosetting composition.

3. The method of claim 1, wherein the one or more epoxidized fatty acid esters comprises epoxidized sucrose soyate (ESS), an epoxidized glycerol ester of one or more fatty acids of a plant oil, or both.

4. The method of claim 1, further comprising introducing a fracturing fluid comprising proppant particles into the formation after introducing the thermosetting composition or the thermoset particulates into the formation.

5. The method of claim 1, wherein allowing voids to form in the proppant matrix comprises treating a thermoset formed from the thermosetting composition with an alkaline fluid.

6. The method of claim 5, wherein the alkaline fluid is introduced into the formation separately from the fracturing fluid and the thermosetting composition.

7. The method of claim 1, wherein allowing voids to form in the proppant matrix comprises introducing the thermoset particulates into the formation in an alkaline carrier fluid.

8. The method of claim 7, wherein the alkaline carrier fluid comprises a fracturing fluid.

9. The method of claim 1, wherein a pump is used to introduce the fracturing fluid into the formation.

10. The method of claim 1, wherein the one or more di- or tricarboxylic acids comprises succinic acid, (E)-butenedioic acid, (Z)-butenedioic acid, oxobutanedioic acid, 2-oxopentanedioic acid, hexanedioic acid, prop-1-ene-1,2,3-tricarboxylic acid, 1-hydroxypropane-1,2,3-tricarboxylic acid, benzene-1,3,5-tricarboxylic acid, decanedioic acid, benzene-1,2,3,4,5,6-hexacarboxylic acid, isocitric acid, aconitic acid, or propane-1,2,3-tricarboxylic acid, or a combination thereof.

11. A method of diverting a treatment fluid in a subterranean formation, comprising:
introducing a first fracturing fluid into the formation to create fractures in the formation;
introducing (i) a thermosetting composition comprising one or more di- or tricarboxylic acids and one or more epoxidized fatty acid esters or (ii) thermoset particulates comprising an anhydride network of one or more epoxidized fatty acid esters cross-linked with one or more di- or tricarboxylic acids, into the formation, wherein the one or more di- or tricarboxylic acids comprises succinic acid, (E)-butenedioic acid, (Z)-butenedioic acid, oxobutanedioic acid, 2-oxopentanedioic acid, hexanedioic acid, prop-1-ene-1,2,3-tricarboxylic acid, 1-hydroxypropane-1,2,3-tricarboxylic acid, benzene-1,3,5-tricarboxylic acid, decanedioic acid, benzene-1,2,3,4,5,6-hexacarboxylic acid, isocitric acid, aconitic acid, or propane-1,2,3-tricarboxylic acid, or a combination thereof;

allowing (i) the thermosetting composition to form a thermoset, or (ii) the thermoset particulates to block the created fractures in the formation;

introducing a second fracturing fluid into the formation to create additional fractures; and diverting the second fracturing fluid away from the created fractures.

12. The method of claim 11, wherein the thermosetting composition further comprises water, and the water is present in the thermosetting composition in an amount of about 0.01 to 50 percent by weight of the thermosetting composition;

the one or more di- or tricarboxylic acids is present in the thermosetting composition in an amount of about 0.01 to 50 percent by weight of the thermosetting composition; and the one or more epoxidized fatty acid esters is present in the thermosetting composition in an amount of about 0.01 to 30 percent by weight of the thermosetting composition.

13. The method of claim 11, wherein the one or more epoxidized fatty acid esters comprises epoxidized sucrose soyate (ESS), an epoxidized glycerol ester of one or more fatty acids of a plant oil, or both.

14. The method of claim 11, wherein the thermosetting composition or the thermoset particulates are introduced into the formation in alternating intervals with a fracturing fluid.

15. The method of claim 11, further comprising removing the formed thermoset or the thermoset particulates from the created fractures.

16. The method of claim 15, wherein removing the formed thermoset or the thermoset particulates from the created fractures comprises treating the formed thermoset or the thermoset particulates with an alkaline fluid.

17. A method of controlling fluid loss in a subterranean formation, comprising:

introducing (i) a thermosetting composition comprising one or more di- or tricarboxylic acids and one or more epoxidized fatty acid esters or (ii) thermoset particulates comprising an anhydride network of one or more epoxidized fatty acid esters cross-linked with one or more di- or tricarboxylic acids, into a zone of high permeability of the formation, wherein the one or more di- or tricarboxylic acids comprises succinic acid, (E)-butenedioic acid, (Z)-butenedioic acid, oxobutanedioic acid, 2-oxopentanedioic acid, hexanedioic acid, prop-1-ene-1,2,3-tricarboxylic acid, 1-hydroxypropane-1,2,3-tricarboxylic acid, benzene-1,3,5-tricarboxylic acid, decanedioic acid, benzene-1,2,3,4,5,6-hexacarboxylic acid, isocitric acid, aconitic acid, or propane-1,2,3-tricarboxylic acid, or a combination thereof;

allowing (i) the thermosetting composition to form a thermoset, or (ii) the thermoset particulates to block the zone of high permeability to reduce fluid loss through the zone of high permeability; and introducing a treatment fluid into a zone of low permeability of the formation.

18. The method of claim 17, wherein the thermosetting composition further comprises water, and the water is present in the thermosetting composition in an amount of about 0.01 to 50 percent by weight of the thermosetting composition;

the one or more di- or tricarboxylic acids is present in the thermosetting composition in an amount of about 0.01 to 50 percent by weight of the thermosetting composition; and the one or more epoxidized fatty acid esters is present in the thermosetting composition in an amount of about 0.01 to 30 percent by weight of the thermosetting composition.

19. The method of claim 18, wherein the one or more epoxidized fatty acid esters comprises epoxidized sucrose soyate (ESS), an epoxidized glycerol ester of one or more fatty acids of a plant oil, or both.

20. The method of claim 18, further comprising introducing an alkaline fluid into the formation to degrade the formed thermoset or the thermoset particulates.

* * * * *